US008338978B2

(12) United States Patent
Yasugi et al.

(10) Patent No.: US 8,338,978 B2
(45) Date of Patent: Dec. 25, 2012

(54) WIND TURBINE GENERATOR HAVING ELECTRICAL STORAGE DEVICE AND ACOUSTIC NOISE SUPPRESSION METHOD THEREOF

(75) Inventors: Akira Yasugi, Tokyo (JP); Kasumi Yano, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/091,636

(22) Filed: Apr. 21, 2011

(65) Prior Publication Data

US 2011/0227343 A1 Sep. 22, 2011

Related U.S. Application Data

(63) Continuation of application No. PCT/JP2011/052885, filed on Feb. 10, 2011.

(51) Int. Cl.
H02P 9/04 (2006.01)
(52) U.S. Cl. .......................................................... 290/44
(58) Field of Classification Search .................... 290/44, 290/55
See application file for complete search history.

(56) References Cited

U.S. PATENT DOCUMENTS

| | | | |
|---|---|---|---|
| 6,688,841 B1 | 2/2004 | Wobben | |
| 7,902,689 B2* | 3/2011 | Kinzie et al. | 290/55 |
| 2007/0013194 A1* | 1/2007 | Calley | 290/44 |
| 2008/0179887 A1 | 7/2008 | Kawazoe et al. | |
| 2010/0098541 A1* | 4/2010 | Benito et al. | 416/36 |
| 2010/0133818 A1 | 6/2010 | Kinzie et al. | |
| 2010/0133819 A1* | 6/2010 | Kinzie et al. | 290/44 |
| 2010/0135798 A1* | 6/2010 | Eggleston | 416/36 |
| 2012/0133132 A1* | 5/2012 | Yasugi | 290/44 |

FOREIGN PATENT DOCUMENTS

| | | |
|---|---|---|
| EP | 2 375 561 | 10/2011 |
| JP | 2002-171669 | 6/2002 |
| JP | 3637186 | 1/2005 |
| JP | 2005-36749 | 2/2005 |
| JP | 2007-056686 | 3/2007 |
| JP | 2008-182859 | 8/2008 |
| JP | 2010-159646 | 7/2010 |
| WO | WO 2010/073310 | 7/2010 |

* cited by examiner

*Primary Examiner* — Tulsidas C Patel
*Assistant Examiner* — Stefan Mikailoff
(74) *Attorney, Agent, or Firm* — Manabu Kanesaka; Kenneth M. Berner; Benjamin J. Hauptman

(57) ABSTRACT

A wind power plant includes a wind turbine generator and an electrical storage device that supply electric power to a utility grid. A wind-turbine controller performs for the wind turbine generator an acoustic-noise suppression operation in which the rotational speed of blades is controlled in order to suppress acoustic noise, and also calculates a reduction in output power that is the difference in output power between the normal output power and the acoustic-noise-suppression output power. An electrical-storage-device controller causes the electrical storage device to be charged or discharged, based on the reduction in output power, the acoustic-noise-suppression output power, and the grid-demanded output power demanded from the utility grid. Therefore, the wind power plant can supply, to the utility grid, the electric power demanded from the utility grid even when the operation of suppressing the occurrence of acoustic noise is performed for the wind turbine generator.

7 Claims, 7 Drawing Sheets

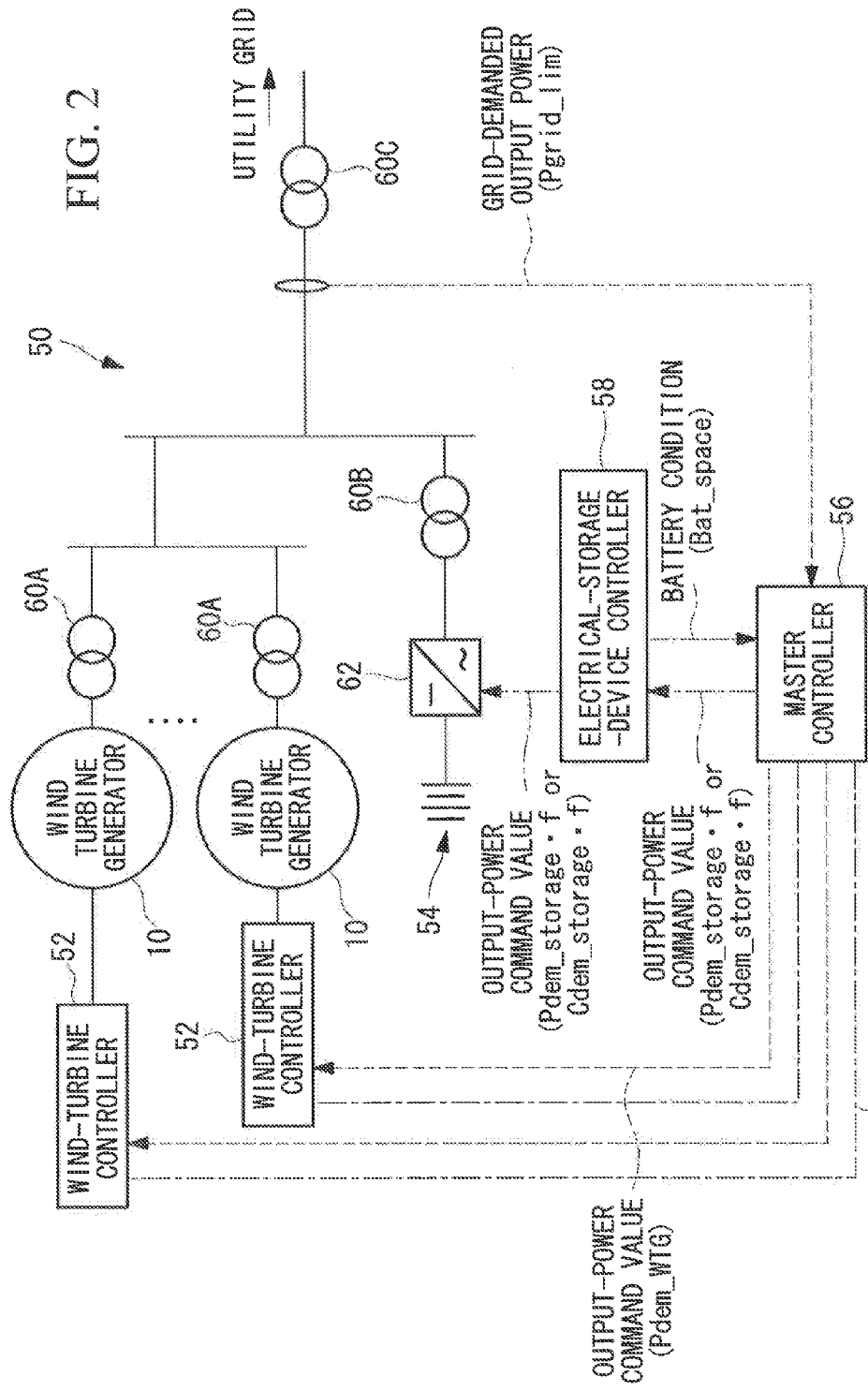

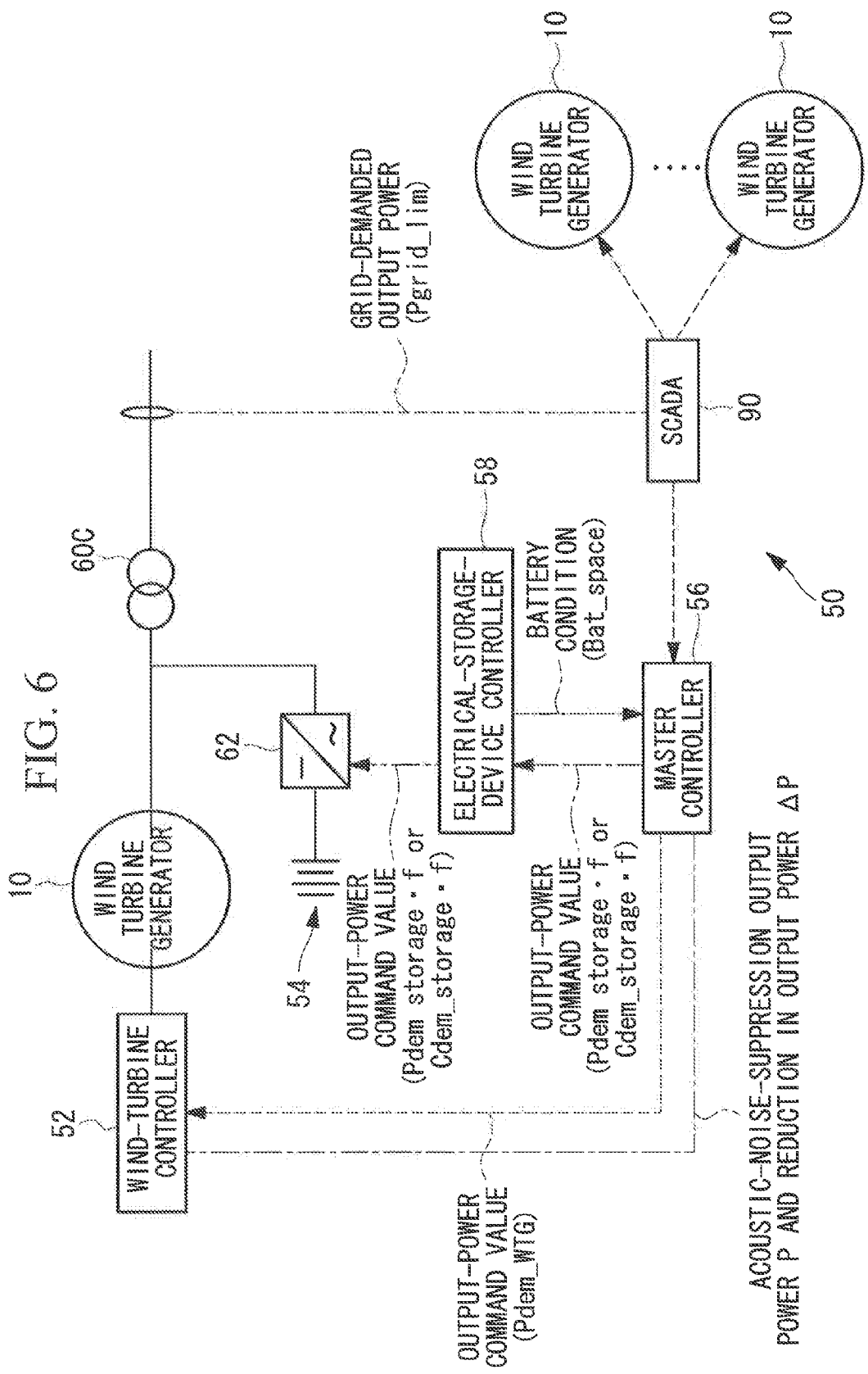

WIND TURBINE GENERATOR HAVING ELECTRICAL STORAGE DEVICE AND ACOUSTIC NOISE SUPPRESSION METHOD THEREOF

CROSS REFERENCE TO RELATED APPLICATIONS

This is a continuation of International Application PCT/JP2011/052885, with an international filing date of Feb. 10, 2011, which is hereby incorporated by reference herein in its entirety.

TECHNICAL FIELD

The present invention relates to a wind power plant and a wind-power-plant control method.

BACKGROUND ART

Wind turbine generators, which convert wind force to electric power, are operated in various locations, including locations adjacent to areas where acoustic noise is regulated. However, when a rotor head having blades is rotated, acoustic noise is generated in some cases, and, in these cases, the acoustic noise needs to be suppressed (reduced).

A conceivable method of suppressing the acoustic noise is to reduce the tip speed of the blades. To reduce the tip speed, the rotational speed of the blades needs to be reduced.

In order to suppress the acoustic noise, an acoustic-noise suppression operation for reducing the rotational speed of the blades is performed in some cases.

Depending on the characteristics of the blades of a wind turbine generator, acoustic noise generated through the rotation of the blades is reduced more when the pitch angles of the blades are set at a feathered side than at a fine side.

A graph in FIG. 7A showing the relationship between the wind speed and the rotational speed of the blades is obtained in an example case where the pitch angles are controlled so as to be set at the feathered side, thereby suppressing an increase in the rotational speed of the blades.

The line A (solid line) in FIG. 7A shows an example case of a normal operation in which the pitch angles of the blades are controlled such that the rotational speed of the blades is set constant at 15 rpm when the wind speed reaches 8.5 m/s. In this case, however, acoustic noise is generated. Therefore, in an acoustic-noise suppression operation shown by the line B (dashed line), when the wind speed is about 7.5 m/s or more, the pitch angles are set at a more feathered side than in the normal operation such that the level of the acoustic noise becomes 105 dB, for example. Accordingly, the rotational speed of the blades is reduced more than in the normal operation when the wind speed falls in a range from about 7.5 m/s to 14 m/s, and it reaches 15 rpm when the wind speed becomes 14 r/s.

PTL 1 discloses a technology of reducing acoustic noise while suppressing deterioration in the performance of a wind turbine generator by setting the pitch angles at a feathered side. PTL 1 describes a technology in which a blade pitch-angle control section calculates, for each wind-turbine blade, a first pitch-angle command value from the target pitch angle and the actual pitch angle of the wind-turbine blade, calculates, for each wind-turbine blade, an acoustic-noise index value by using a function having parameters of the rotational speed of the wind-turbine blades and the distance from a predetermined observation point set in advance to the wind-turbine blades, and corrects the first pitch-angle command value of a wind-turbine blade whose acoustic-noise index value is equal to or larger than a predetermined threshold, to a feathered-side value.

{Citation List}
{Patent Literature}
{PTL 1} Japanese Unexamined Patent Application, Publication No. 2010-159646

SUMMARY OF INVENTION

Technical Problem

However, as shown by the relationship between the wind speed and the output power of the wind turbine generator of FIG. 7B, when the wind speed is high, part of the wind energy is fended off more in the acoustic-noise suppression operation shown by the line B (dashed line) than in the normal operation shown by the line A (solid line); therefore, the output power with respect to the wind speed is reduced more in the acoustic-noise suppression operation shown by the line B. Thus, when the wind turbine generator is connected to a utility grid, the wind turbine generator cannot produce output power that meets the output power demanded from the utility grid, in some cases.

The present invention has been made in view of this problem, and an object thereof is to provide a wind power plant and a wind-power-plant control method, capable of controlling electric power so as to meet the demand from the utility grid while an operation of suppressing the occurrence of acoustic noise is performed for the wind turbine generator.

Solution to Problem

In order to solve the above-described problem, the present invention employs the following solutions.

Specifically, according to the present invention, there is provided a wind power plant includes a wind turbine generator that supplies electric power to a utility grid, and an electrical storage device that is charged by electric power produced by the wind turbine generator or electric power supplied from the utility grid and that supplies electric power to the utility grid through discharging, the wind power plant including: a wind-turbine control section that performs for the wind turbine generator an acoustic-noise suppression operation in which rotational speed of blades is controlled in order to suppress acoustic noise generated through rotation of the blades; and an electrical-storage-device control section that causes the electrical storage device to be charged or discharged, based on an output power obtained when the acoustic-noise suppression operation is performed and a demanded output power demanded from the utility grid.

According to the present invention, the wind power plant includes the wind turbine generator that supplies electric power to the utility grid, and the electrical storage device that is charged by electric power produced by the wind turbine generator or electric power supplied from the utility grid and that supplies electric power to the utility grid through discharging.

Then, the wind-turbine control section performs, for the wind turbine generator, the acoustic-noise suppression operation in which the rotational speed of the blades is controlled in order to suppress acoustic noise generated through rotation of the blades. Furthermore, the electrical-storage-device control section causes one electrical storage device to be charged or discharged, based on the output power obtained when the acoustic-noise suppression operation is performed and the demanded output power demanded from the utility grid.

Therefore, according to the present invention, since charging and discharging of the electrical storage device are controlled according to the difference between the output power of the wind turbine generator for which the acoustic-noise suppression operation is performed and the demanded output power demanded from the utility grid, it is possible to control the electric cower so as to meet the demand from the utility grid, while the operation of suppressing the occurrence of acoustic noise is performed for the wind turbine generator. In the wind power plant provided with the electrical storage device, the electric power can be controlled sc as to easily meet the demand from the utility grid, without adding an additional device.

Furthermore, in the above-described configuration, it is preferable that the electrical-storage-device control section cause the electrical storage device to discharge electric power when the output power is equal to or less than the demanded output power.

Furthermore, in the above-described configuration, it is preferable that the electrical-storage-device control section cause the electrical storage device to be charged by electric power corresponding to あ difference between the output power and the demanded output power when the output power exceeds the demanded output power.

Furthermore, in the above-described configuration, it is preferable that, when the acoustic-noise suppression operation is not performed, the wind-turbine control section make the wind turbine generator perform an over power operation in which electric power is excessively output compared with あ normal operation; and, when the wind turbine generator is made to perform the over power operation, the electrical-storage-device control section cause the electrical storage device to be charged by electric power corresponding to a difference between the output power produced in the normal operation and the output power produced in the over power operation.

According to the present invention, when the acoustic-noise suppression operation is not performed, the wind-turbine control section makes the wind turbine generator perform the over power operation in which the electric power is excessively output compared with the normal operation. Then, when the wind turbine generator is made to perform the over power operation, the electrical-storage-de vice control section causes the electrical storage device to be charged by the electric power corresponding to the difference between the output power produced in the normal operation and the output power produced in the over power operation.

Therefore, according to the present invention, surplus electric power can be exhaustively stored in the electrical storage device.

Furthermore, in the above-described configuration, it is preferable that a plurality of the wind turbine generators be installed adjacent to an area where acoustic noise is regulated such that a level of acoustic noise is reduced to a predetermined value or lower; and the wind-turbine control section cancel the acoustic-noise suppression operation of a wind turbine generator of the plurality of the wind turbine generators that has a relatively-small acoustic-noise effect on the area when the electrical storage device is discharged for a predetermined period of time or more because of the acoustic-noise suppression operation.

According to the present invention, when the electrical storage device is discharged for a predetermined period of time or more because of the acoustic-noise suppression operation, the acoustic-noise suppression operation is cancelled for a wind turbine generator that has a small acoustic-noise effect relatively on the area where acoustic noise is regulated such that the level of acoustic noise is reduced to a predetermined value or lower.

On the other hand, according to the present invention, there is provided a wind-power-plant control method for a wind power plant that includes a wind turbine generator that supplies electric power to a utility grid, and an electrical storage device that is charged by electric power produced by the wind turbine generator or electric power supplied from the utility grid and that supplies electric power to the utility grid through discharging, the wind-power-plant control method including: performing for the wind turbine generator an acoustic-noise suppression operation in which the rotational speed of blades is controlled in order to suppress acoustic noise generated through rotation of the blades; and causing the electrical storage device to be charged or discharged, based on an output power obtained when the acoustic-noise suppression operation is performed and a demanded output power demanded from the utility grid.

According to the present invention, since charging and discharging of the electrical storage device are controlled according to the difference between the output power of the wind turbine generator for which the acoustic-noise suppression operation is performed and the demanded output power demanded from the utility grid, it is possible to control the electric power so as to meet the demand from the utility grid, while the operation of suppressing the occurrence of acoustic noise is performed for the wind turbine generator.

Advantageous Effects of Invention

According to the present invention, a beneficial effect is afforded in that electric power can be controlled so as to meet the demand from the utility grid, while the operation of suppressing the occurrence of acoustic noise is performed for the wind turbine generator.

BRIEF DESCRIPTION OF DRAWINGS

FIG. 2 is a configuration diagram of a wind power plant according to the embodiment of the present invention.

FIG. 6 is a configuration diagram of a wind power plant according to another embodiment of the present invention.

DESCRIPTION OF EMBODIMENTS

An embodiment of the present invention will be described below.

Figure 1:
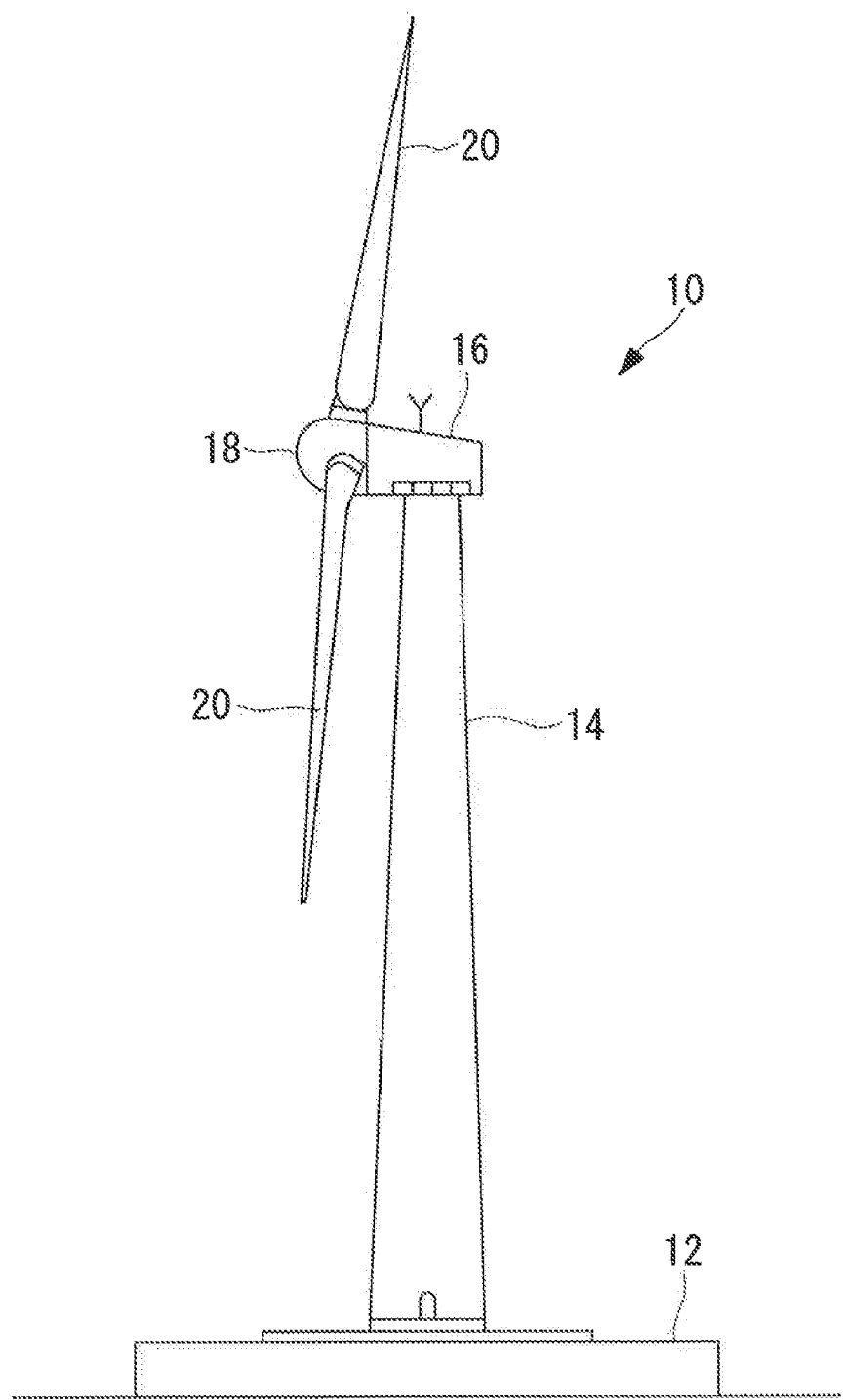
FIG. 1 is a view showing the external structure of a wind turbine generator according to an embodiment of the present invention.

FIG. 1 is an external view of a wind turbine generator 10 according to this embodiment.

The wind turbine generator 10 shown in FIG. 1 has a tower 14 provided upright on a foundation 12, a nacelle 16 provided on the top of the tower 14, and a rotor head 18 provided on the nacelle 16 so as to be able to rotate about a substantially-horizontal axis.

A plurality of (in this embodiment, for example, three) wind-turbine rotor blades 20 (hereinafter, simply referred to as "blades 20") are attached to the rotor head 18 radially from the rotational axis of the rotor head 18. With this structure, a wind force striking against the blades 20 from the direction of the rotational axis of the rotor head 18 is converted to mechanical power for rotating the rotor head 18 about the rotational axis, and the mechanical power is converted to electric power by a generator. The blades 20 are coupled to the rotor head 18 so as to be able to rotate with respect to the wind direction, and the pitch angles of the blades 20 can be changed.

FIG. 2 is a configuration diagram of a wind power plant 50 according to this embodiment. The wind power plant 50 of this embodiment is located adjacent to an area where acoustic noise is regulated such that the level of acoustic noise is reduced to a predetermined value or lower (hereinafter, referred to as "acoustic-noise regulated area"), for example.

The wind power plant 50 includes a plurality of wind turbine generators 10 (n wind turbine generators 10; hereinafter, n serves as the number for identifying a specific corresponding wind turbine generator 10), a wind-turbine controller 52 provided for each of the wind turbine generators 10 to control the wind turbine generator 10, an electrical storage device 54, a master controller 56 that controls the wind turbine generators 10 and the electrical storage device 54, and an electrical-storage-device controller 58 that controls the electrical storage device 54.

Therefore, according to the present invention, it is possible to suppress a decrease in the electric power of a charged electrical storage device.

The respective wind turbine generators 10 are electrically connected to each other via transformers 60A, and the electrical storage device 54 is electrically connected to the wind turbine generators 10 via a DC/AC converter 62 and a transformer 60B. Furthermore, the wind turbine generators 10 and the electrical storage device 54 are connected to a utility grid via a transformer 60C, and the electric power can be supplied to the utility grid.

Since the electrical storage device 54 is electrically connected to the wind turbine generators 10, it can be charged by electric power produced by the wind turbine generators 10 or electric power supplied from the utility grid, and it supplies electric power to the utility grid through discharging. Through charging and discharging of the electrical storage device 54, the electric power to be supplied from the wind power plant 50 to the utility grid is compensated for. In this embodiment, a battery is used as the electrical storage device 54; however, the electrical storage device 54 is not limited thereto, and other electrical storage devices, such as a capacitor, can also be used.

The master controller 56 sends to and receives from the wind-turbine controllers 52 various data used to control the wind turbine generators 10. Specifically, for example, the master controller 56 sends to each of the wind-turbine controllers 52 an output-power command value Pdem_WTG that indicates the electric power to be output by the corresponding wind turbine generator 10 and receives from the wind-turbine controller 52 data indicating an acoustic-noise-suppression output power P and reduction in output power ΔP of the wind turbine generator 10.

Furthermore, the master controller 56 sends to and receives from the electrical-storage-device controller 58 various data used to cause the electrical storage device 54 to be charged and discharged. Specifically, for example, the master controller 56 sends to the electrical-storage-device controller 58 an output-power command value Pdem_storage·f and an output-power command value Cdem_storage-f that are respectively used to cause the electrical storage device 54 to be charged and discharged, and receives from the electrical-storage-device controller 58 a battery condition Bat_space that indicates the remaining amount of electric power in the charged electrical storage device 54.

Furthermore, the master controller 56 receives grid-demanded output power Pgrid_lim indicating the magnitude of an output power that the utility grid demands from the wind power plant 50. The grid-demanded output power Prid_lim of this embodiment indicates the upper limit of the output power to be supplied to the utility grid.

The wind-turbine controller 52 of this embodiment can perform for the control-target wind turbine generator 10 an acoustic-noise suppression operation in which the rotational speed of the blades 20 is controlled in order to suppress acoustic noise generated through the rotation of the blades 20. The acoustic-noise suppression operation of this embodiment is executed such that the pitch angles of the blades 20 are set at a more feathered side so as to fend off the wind energy to reduce the rotational speed of the blades 20, thereby suppressing the acoustic noise.

Figure 3A:
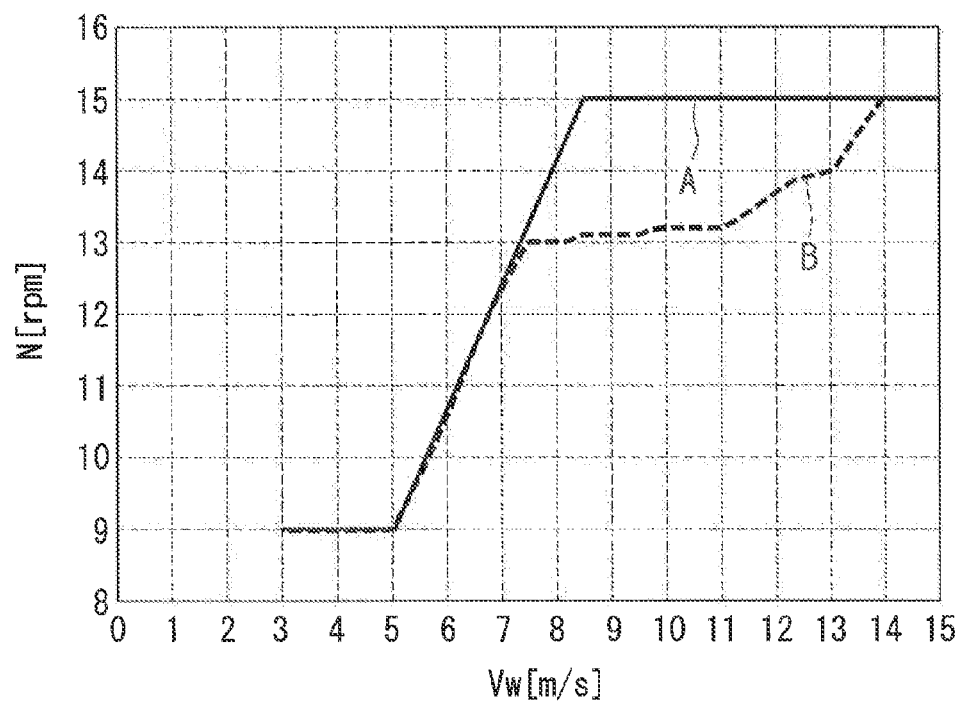
FIG. 3A is a graph showing the difference between a normal operation and an acoustic-noise suppression operation according to the embodiment of the present invention and showing the relationship between the wind speed and the rotational speed of blades.
Figure 3B:
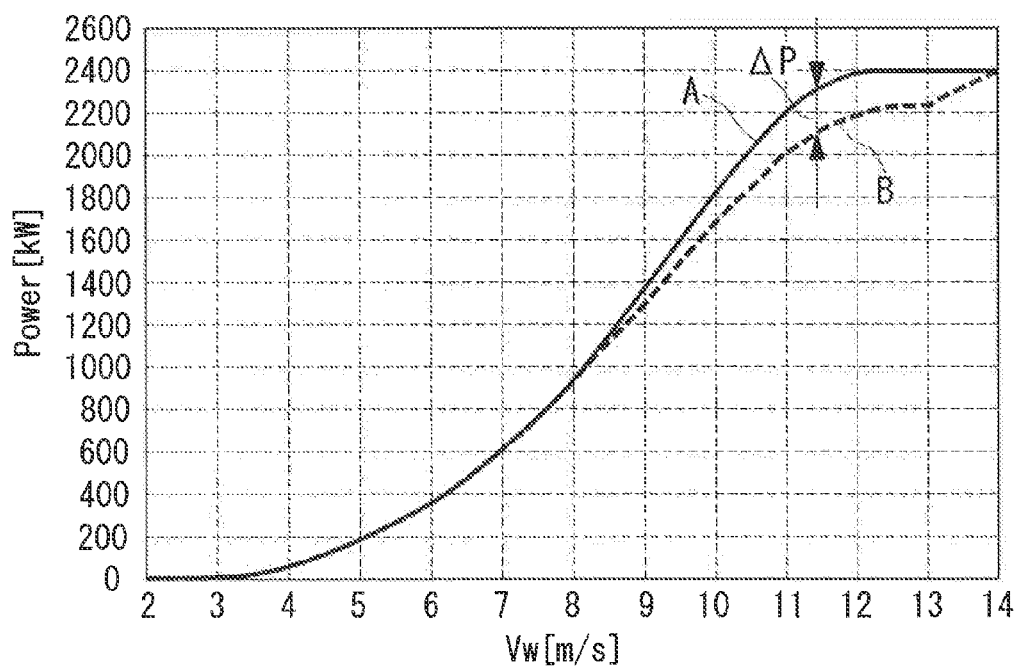
FIG. 3B is a graph showing the difference between a normal operation and acoustic-noise suppression operation according to the embodiment of the present invention and showing the relationship between the wind speed and the output power of the wind turbine generator.

FIG. 3A and FIG. 3B are of graphs showing the difference between the acoustic-noise suppression operation of this embodiment and a normal operation. FIG. 3A is a graph showing the relationship between the wind speed (Vw, measured in meters per second, m/s) and the rotational speed of the blades 20 (N, measured in revolutions per minute rpm), and FIG. 3B is a graph showing the relationship between the wind speed and the output power of the wind turbine generator 10.

The line A (solid line) in FIG. 3A shows an example case of the normal operation in which the pitch angles of the blades are controlled such that the rotational speed of the blades is set constant at 15 rpm when the wind speed reaches 8.5 m/s. In this case, however, acoustic noise is generated. Therefore, in the acoustic-noise suppression operation shown by the line B (dashed line), when the wind speed is about 7.5 m/s or more, the pitch angles are set at a more feathered side than in the normal operation such that the level of the acoustic noise is limited to 105 dB, for example. Accordingly, the rotational speed of the blades is reduced more than in the normal operation when the wind speed falls in a range from about 7.5 m/s to 14 m/s, and the rotational speed reaches 15 rpm when the wind speed becomes 14 m/s.

The wind-turbine controller 52 performs the acoustic-noise suppression operation for the wind turbine generator 10 in the following cases, for example, when it reaches a predetermined period of time for example, nighttime) during which the occurrence of acoustic noise is regulated, when the level of acoustic noise generated from the wind turbine generator 10 reaches a predetermined value or larger, when the wind speed reaches a predetermined value or larger, when an operator of the wind power plant 50 issues an operational instruction, or the like.

Each of the wind-turbine controllers 52 of this embodiment performs the acoustic-noise suppression operation and also calculates the reduction in output power ΔP that is the difference in output power between the normal output power that is obtained when the normal operation is performed without performing the acoustic-noise suppression operation and the acoustic-noise-suppression output power P that is obtained when the acoustic-noise suppression operation is performed and sends the reduction in output power ΔP to the master controller 56, as described above.

Then, the master controller 56 of this embodiment generates a command value used to cause the electrical storage device 54 to be charged and discharged, based on the reduction in output power ΔP, the acoustic-noise-suppression output power P, and the grid-demanded output power Pgrid_lim and sends the generated command value to the electrical-storage-device controller 58.

Figure 4:
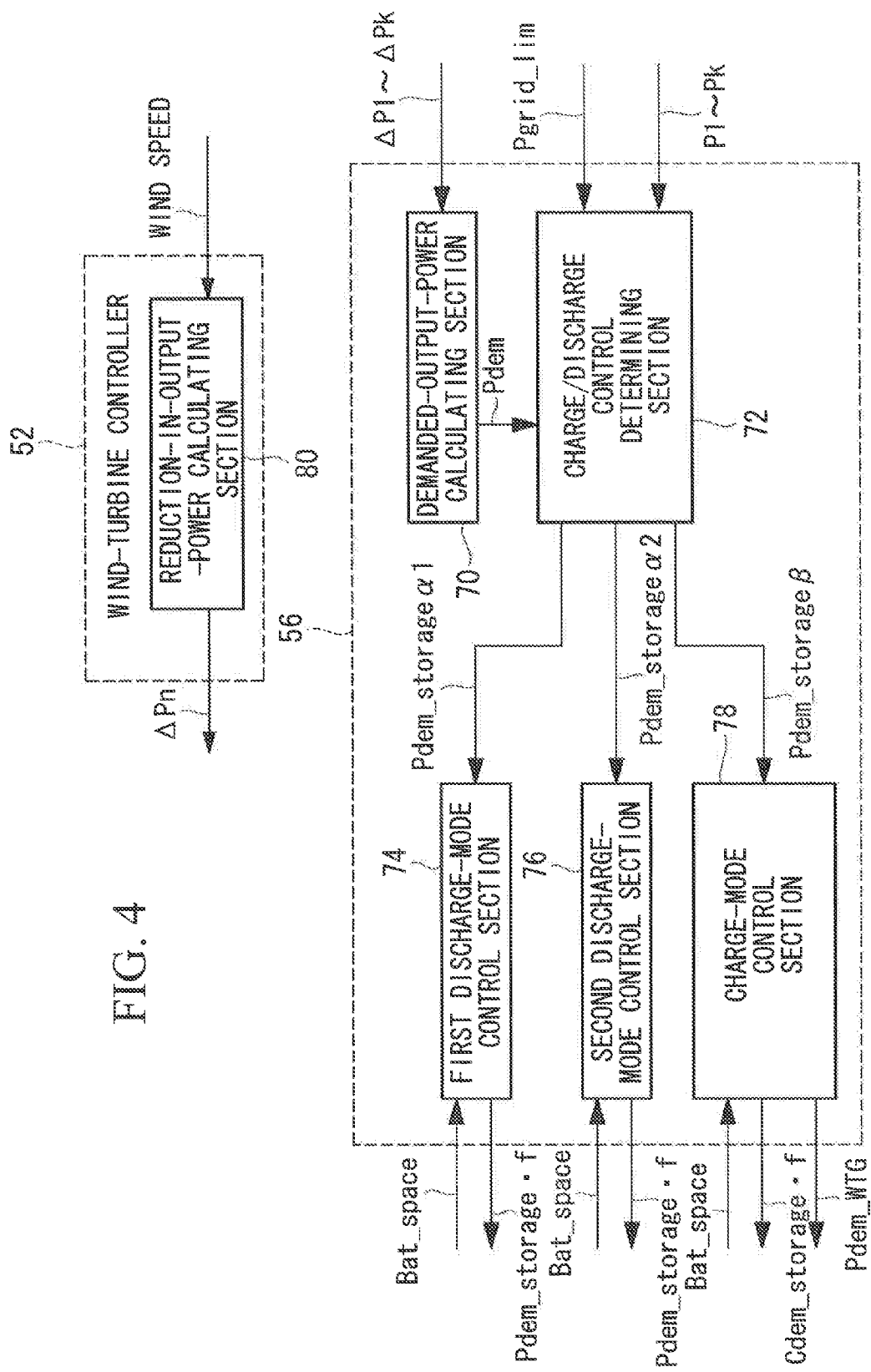
FIG. 4 is a schematic diagram showing details of processing performed in a master controller according to the embodiment of the present invention.

FIG. 4 is a schematic diagram showing details of processing performed in the master controller 56 when the acoustic-noise suppression operation is performed for the wind turbine generator 10.

The master controller 56 includes a demanded-output-power calculating section 70, a charge/discharge control determining section 7, a first discharge-mode control section 74, a second discharge-mode control section 76, and a charge-mode control section 78.

The demanded-output-power calculating section 70 receives a reduction in output power APn (n=1 to k wherein n and k are integers) sent from the respective wind-turbine controllers 52, calculates the total sum of the reduction in output power APn as a demanded output power Pdem, as shown in Formula (1), and outputs the demanded output power Pdem to the charge/discharge control determining section 72.

{Formula 1}

$$\sum_{n=1}^{k} \Delta Pn = Pdem \tag{1}$$

Each of the wind-turbine controllers 52 includes a reduction-in-output-power calculating section 80. The reduction-in-output-power calculating section 80 calculates the normal output power and the acoustic-noise-suppression output power from the wind speed with respect to the wind turbine generator 10 for which the acoustic-noise suppression operation is performed and calculates the difference between the calculated normal output power and acoustic-noise-suppression output power, as the reduction in output power. The wind speed is measured by, for example, an anemometer (not shown) provided near the wind turbine generator 10.

The charge/discharge control determining section 72 receives the demanded output power Pdem from the demanded-output-power calculating section 70 and receives the acoustic-noise-suppression output power Pn for each of the n wind turbine generator units (n=1 to k) from the wind-turbine controllers 52 and the grid-demanded output power Pgrid_lim. Then, the charge/discharge control determining section 72 determines whether to cause the electrical storage device 54 to be discharged or charged, by using the grid-demanded output power Pgrid_lim, the acoustic-noise-suppression output power Pn, and the demanded output power Pdem.

Figure 5A:
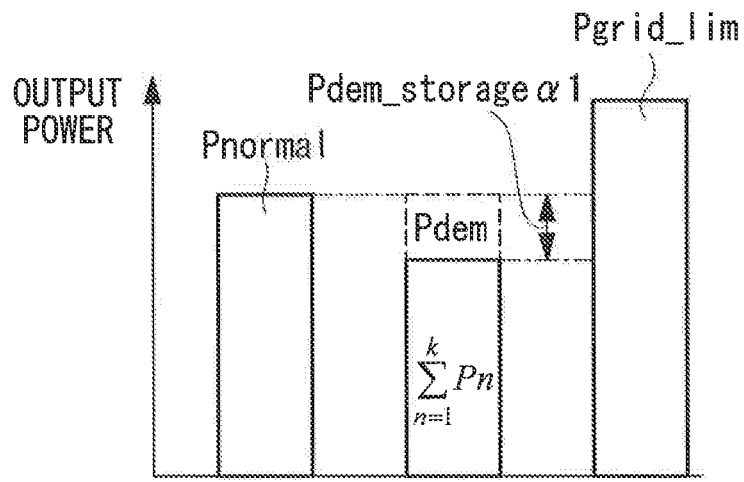
FIG. 5A is a graph showing demanded output power and output power produced in respective operational states according to the embodiment of the present invention and showing a case where the sum of acoustic-noise-suppression output power and reduction in output power is equal to or less than the grid-demanded output power.

Specifically, as shown in FIG. 5A and Formula (2), when the sum of the total sum of the acoustic-noise-suppression output power Pn and the demanded output power Pdem is equal to or lower than the grid-demanded output power Pgrid_lim, the charge/discharge control determining section 72 outputs to the first discharge-mode control section 74 a discharge signal Pdem_storage α1 causing the electrical storage device 54 to be discharged. Pnormal shown in FIG. 5A to FIG. 5C indicates the total sum of the normal output power of the plurality of (n=1 to k) wind turbine generators 10.

{Formula 2}

$$Pgrid\_lim \geq \sum_{n=1}^{k} Pn + Pdem \tag{2}$$

The discharge signal Pdem_storage α1 output to the first discharge-mode control section 74 when Formula (2) is established is set to the demanded output power Pdem, as shown in Formula (3).

{Formula 3}

$$Pdem\_storage \alpha 1 = Pdem \tag{3}$$

When the discharge signal Pdem_storage α1 is received from the charge/discharge control determining section 72, the first discharge-mode control section 74 outputs the value of the discharge signal Pdem_storage α1 to the electrical-storage-device controller 58 as the output-power command value Pdem_storage·f, as shown in Formula (4).

{Formula 4}

$$Pdem\_storage \cdot f = Pdem\_storage \alpha 1 \tag{4}$$

However, when the remaining amount in the electrical storage device 54 is less than the demanded output power Pdem, the value of the battery condition Bat_space is output to the electrical-storage-device controller 58 as the output-power command value Pdem_storage·f, as shown in Formula (5).

{Formula 5}

$$Pdem\_storage \cdot f = Bat\_space \tag{5}$$

Figure 5B:
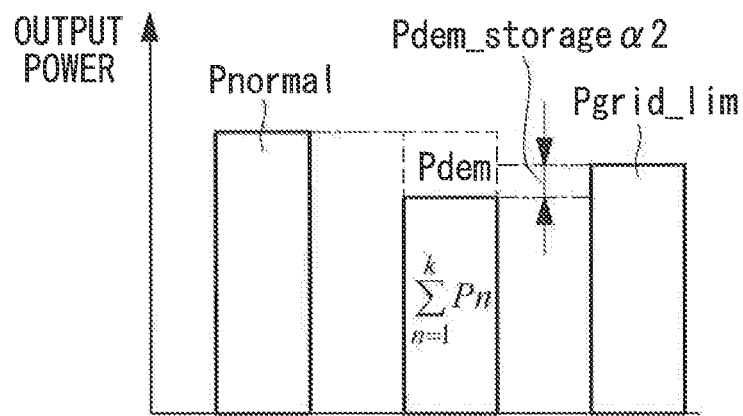
FIG. 5B is a graph showing demanded output power and output power produced in respective operational states according to the embodiment of the present invention and showing a case where the sum of the acoustic-noise-suppression output power and the reduction in output power exceeds the grid-demanded output power, and the grid-demanded output power exceeds the acoustic-noise-suppression output power.

On the other hand, as shown in FIG. 5B and Formula (6), when the sum of the total sum of the acoustic-noise-suppression output power Pn and the demanded output power Pdem exceeds the grid-demanded output power Pgrid_lim, and the grid-demanded output power Pgrid_lim exceeds the total sum of the acoustic-noise-suppression output power Pn, the charge/discharge control determining section 72 outputs to the second discharge-mode control section 76 a discharge signal Pdem_storage α2 causing the electrical storage device 54 to be discharged.

{Formula 6}

$$\left(\sum_{n=1}^{k} Pn + Pdem\right) > \text{Pgrid\_lim} > \sum_{n=1}^{k} Pn \quad (6)$$

When the discharge signal Pdem_storage α2 is received from the charge/discharge control determining section 72, the second discharge-mode control section 76 calculates the output-power command value Pdem_storage·f causing the electrical storage device 54 to discharge the electric power corresponding to the difference between the grid-demanded output power Pgrid_lim and the total sum of the acoustic-noise-suppression output power Pn, as shown in Formula (7), and outputs the calculated output-power command value Pdem_storage·f to the electrical-storage-device controller 58.

{Formula 7}

$$\text{Pdem\_storage} \cdot f = \text{Pgrid\_lim} - \sum_{n=1}^{k} Pn \quad (7)$$

However, when the remaining amount in the electrical storage device 54 is less than the difference calculated using Formula 7, the value of the battery condition Bat_space is output to the electrical-storage-device controller 58 as the output-power command value Pdem_storage·f, as shown in Formula 8.

{Formula 8}

$$\text{Pdem\_storage} \cdot f = \text{Bat\_space} \quad (8)$$

Figure 5C:
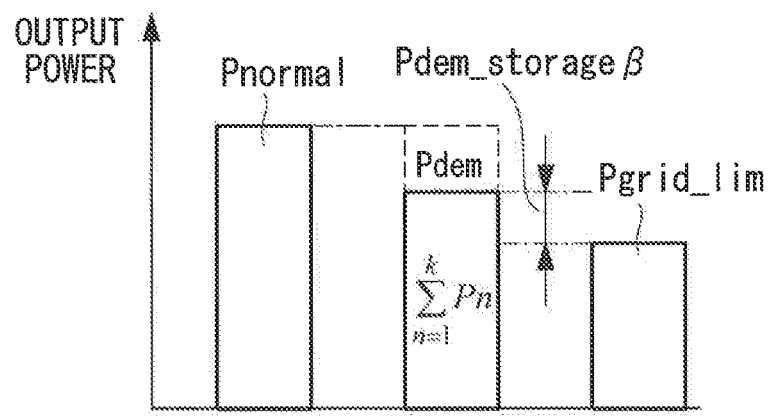
FIG. 5C is a graph showing demanded output power and output power produced in respective operational states according to the embodiment of the present invention and showing a case where the acoustic-noise-suppression output power exceeds the grid-demanded output power.
Figure 7A:
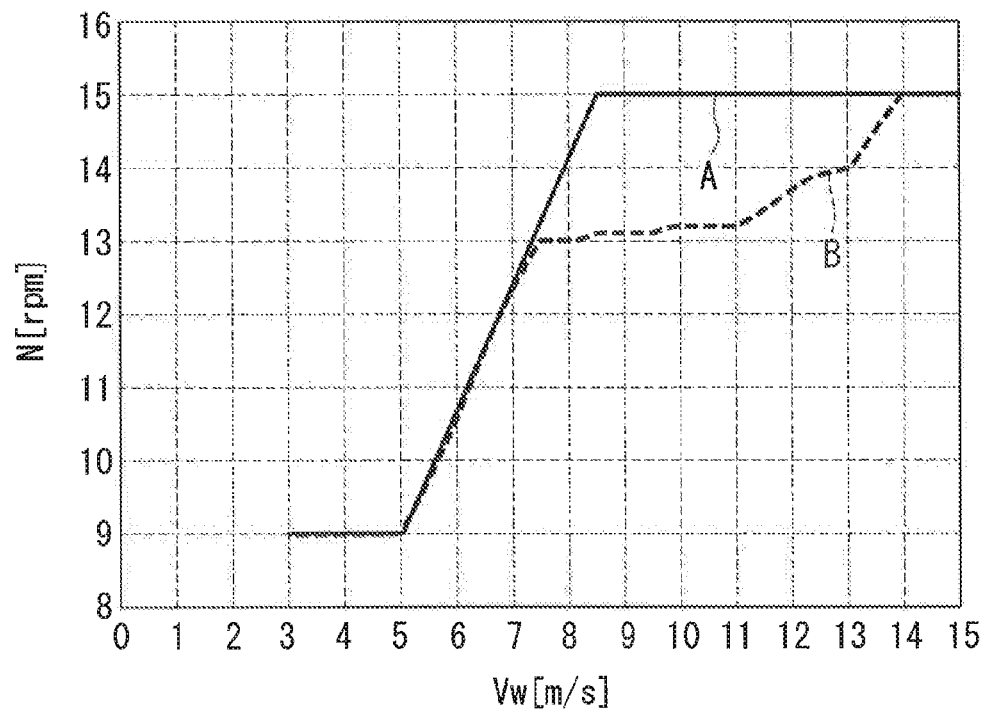
FIG. 7A is a graph showing the difference between an acoustic-noise suppression operation and a normal operation and showing the relationship between the wind speed and the rotational speed of blades.
Figure 7B:
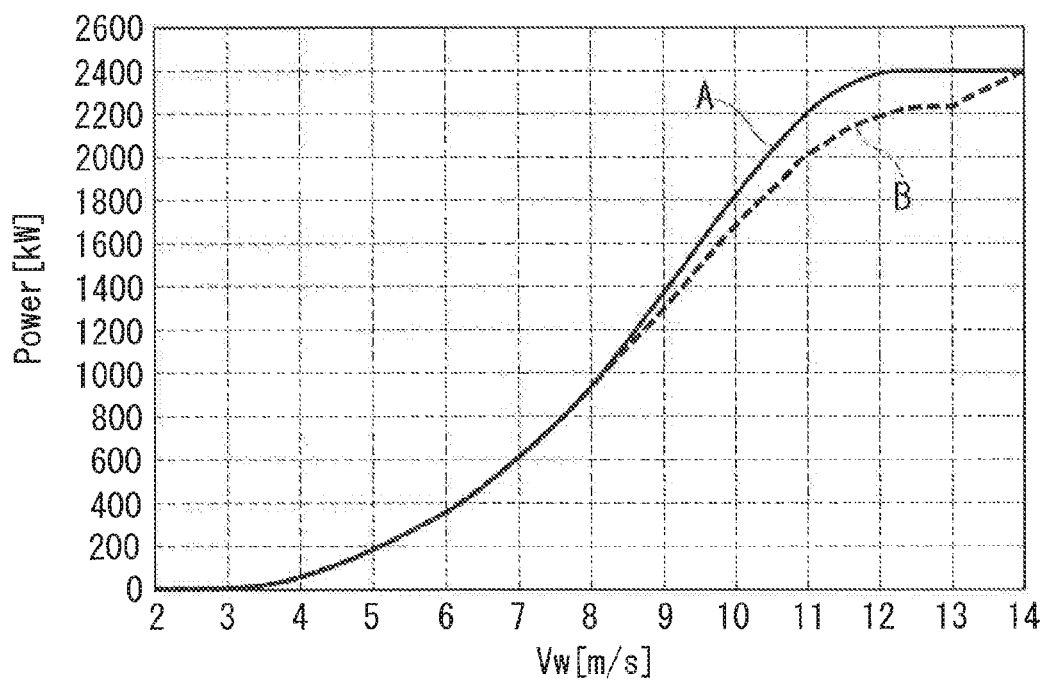
FIG. 7B is a graph showing the difference between an acoustic-noise suppression operation and a normal operation and showing the relationship between the wind speed and the output power of the wind turbine generator.

Furthermore, as shown in FIG. 5C and Formula (9), when the total sum of the acoustic-noise-suppression output power Pn exceeds the grid-demanded output power Pgrid_lim, the charge/discharge control determining section 72 outputs to the charge-mode control section 78 a charge signal Pdem_storage β causing the electrical storage device 54 to be charged by surplus electric power produced by the wind turbine generators 10. The total sum of the acoustic-noise-suppression output power Pn exceeds the grid-demanded output power Pgrid_lim, for example, in the nighttime or when the electric power consumption of facilities (factories etc.) that use a lot of electric power is stopped.

{Formula 9}

$$\text{Pgrid\_lim} < \sum_{n=1}^{k} Pn \quad (9)$$

When Formula (9) is established, the demanded output power Pdem is set to 0 (zero), as shown in Formula (10), and the charge signal Pdem_storage β to be output to the charge-mode control section 78 is set to the difference between the total sum of the acoustic-noise-suppression output power Pn and the grid-demanded output power Pgrid_lim.

{Formula 10}

$$\text{Pdem\_storage} \beta = \sum_{n=1}^{k} Pn - \text{Pgrid\_lim} \quad (10)$$

When the charge signal Pdem_storage β is received from the charge/discharge control determining section 72, the charge-mode control section 78 outputs to the electrical-storage-device controller 58 the value of the charge signal Pdem_storage β as the output-power command value Cdem_storage·f, as shown in Formula (11).

{Formula 11}

$$\text{Cdem\_storage} \cdot f = \text{Pdem\_storage} \beta \quad (11)$$

However, we the amount of electric power that can be used to charge the electrical storage device 54 is less than the difference calculated using Formula (10), the value of the battery condition Bat_space is output to the electrical-storage-device controller 58 as the output-power command value Cdem_storge·f, as shown in Formula (12).

{Formula 12}

$$\text{Cdem\_storage} \cdot f = \text{Bat\_Space} \quad (12)$$

Furthermore, the charge-mode control section 78 outputs to each wind-turbine controller 52 the output-power command value Pdem_WTG that gives an output-power limit to the wind turbine generator 10, such that the output power to be supplied to the utility grid does not exceed the grid-demanded output power Pgrid_lim.

When the output-power command value Pdem_WTG is received, the wind-turbine controller 52 executes control of the output-power limit, for the wind turbine generator 10. The output-power limit is to perform control (an unloaded operation) such that the pitch angles of the blades 20 are set at a more feathered side, for example.

When the acoustic-noise suppression operation is not performed, and the output power of the wind turbine generators exceeds the grid-demanded output power Pgrid_lim, the master controller 56 also causes the electrical storage device 54 to be charged by the electric power corresponding to the difference between the output power of the wind turbine generators 10 and the grid-demanded output power Pgrid_lim, according to the value of the battery condition Bat_space.

Next, charging-and-discharging control executed for the electrical storage device 54 when the acoustic-noise suppression operation is performed for the wind turbine generators 10 will be described using specific numerical values.

It is assumed that the acoustic-noise suppression operation is performed for ten wind turbine generator 10 provided in the wind power plant 50, and the reduction in output power of each of the wind turbine generators 10 produced during a predetermined time is 0.2 MW. In this case, the demanded output power Pdem is 2 MW (0.2×10=2).

When the grid-demanded output power Pgrid_lim demanded from the utility grid is 22 MW, if the total output power of the ten wind turbine generators 10 for which the acoustic-noise suppression operation is performed is 22 MW, the discharge signal Pdem_storage is set to 0 MW, and the output-power command value Pdem_storage·f sent to the electrical storage device 54 is 0 MW. Thus, the electrical storage device 54 does not perform charging or discharging.

Furthermore, when the grid-demanded output power Pgrid_lim demanded from the utility grid is 20 MW, if the total output power of the ten wind turbine generators 10 for which the acoustic-noise suppression operation is performed is 22 MW, the charge signal Pdem_storage β is set to +2 MW, and thus, the electrical storage device 54 is charged by 2 MW.

As described above, the wind power plant 50 of this embodiment includes the electrical storage device 54 and the wind turbine generators 10, which supply electric power to the utility grid. The wind-turbine controller 52 performs for the wind turbine generators 10 the acoustic-noise suppression operation, in which the rotational speed of the blades 20 is controlled in order to suppress acoustic noise generated through the rotation of the blades 20, and calculates the reduction in output power, which is the difference in output power between the normal output power, obtained when the normal operation is performed, and the acoustic-noise-suppression output power, obtained when the acoustic-noise suppression operation is performed. Furthermore, the master controller 56 outputs to the electrical-storage-device controller 58 a command causing the electrical storage device 54 to be charged or discharged, based on the reduction in output power, the acoustic-noise-suppression output power, and the grid-demanded output power demanded from the utility grid.

Therefore, the wind power plant 50 can perform electric power control so as to meet the demand from the utility grid, while the operation of suppressing the occurrence of the acoustic noise is performed for the wind turbine generators 10.

Furthermore, when the sum of the acoustic-noise-suppression output power and the reduction in output power is equal to or less than the grid-demanded output power, the wind power plant 50 of this embodiment causes the electrical storage device 54 to discharge, to the utility grid, the electric power corresponding to the reduction in output power.

Furthermore, when the sum of the acoustic-noise-suppression output power and the reduction in output power exceeds the grid-demanded output power, and the grid-demanded output power exceeds the acoustic-noise-suppression output power, the wind power plant 50 of this embodiment causes the electrical storage device 54 to discharge, to the utility grid, the electric power corresponding to the difference between the grid-demanded output power and the acoustic-noise-suppression output power.

Furthermore, when the acoustic-noise-suppression output power exceeds the grid-demanded output power, the wind power plant 50 of this embodiment causes the electrical storage device 54 to be charged by the electric power corresponding to the difference between the acoustic-noise-suppression output power and the grid-demanded output power, that is, the excessively produced electric power.

Although the present invention has been described using the above-described embodiment, the technical scope of the present invention is not limited to the scope described in the embodiment. Various modifications or improvements can be added to the embodiment without departing from the gist of the invention, and aspects in which the modifications or improvements are added are also encompassed in the technical scope of the present invention.

For example, when the acoustic-noise suppression operation is not performed, the wind-turbine controller 52 may make the wind turbine generators 10 perform an over power operation in which electric power is excessively output compared with the normal operation; and, when the wind turbine generators 10 are made to perform the over power operation, the electrical-storage-device controller 58 may cause the electrical storage device 54 to be charged by the electric power corresponding to the difference between the output power obtained in the normal operation and the output power obtained in the over power operation.

Specific example cases of performing the over power operation include a period of time when the acoustic-noise regulation is cancelled, a short period of time (for example, several minutes) during which the acoustic noise is even regulated, etc. in an example of the over power operation, the pitch angles of the blades 20 are set at a fine side, thereby increasing the rotational speed of the blades 20 more than in the normal operation.

Therefore, in the wind power plant 50, the electrical storage device 54 is appropriately charged, and it is possible to handle, in addition to the case where the acoustic-noise suppression operation is performed, a case where the frequency rapidly drops in the utility grid and discharging the electrical storage device 54 is required in order to recover from the drop in frequency.

Furthermore, in the wind power plant 50, when the electrical storage device 54 is discharged for a predetermined period of time (for example, several tens of minutes) or more because of the acoustic-noise suppression operation performed for the plurality of wind turbine generators 10, the acoustic-noise suppression operation may be terminated in a wind turbine generator 10 that has a relatively-small acoustic-noise effect on the acoustic-noise regulated area, and the normal operation may be performed therein.

The wind turbine generator 10 that has a relatively-small acoustic-noise effect on the acoustic-noise regulated area is, for example, a wind turbine generator 10 that is located far from the edge of the acoustic-noise regulated area or a wind turbine generator 10 that has a relatively-small acoustic-noise effect on the acoustic-noise regulated area, according to the wind direction.

The above-described predetermined period of time is a period of time during which a reduction in the output power of the wind turbine generators 10 for which the acoustic-noise suppression operation is performed is predicted. It is determined whether discharging needs to be performed for the above-described predetermined period of time or more, from the wind speed predicted from the previous wind conditions.

Furthermore, the above-described predetermined period of time is defined as an expected elapsed time in which the amount of electric power in the charged electrical storage device 54 becomes a predetermined amount of electric power or less because of discharge of the electrical storage device 54, and may be appropriately changed according to the remaining amount of electric power in the charged electrical storage device 54.

Therefore, the wind power plant 10 can suppress the amount of electric power to be discharged from the electrical storage device 54 and can handle, in addition to the case where the acoustic-noise suppression operation is performed, a case where the frequency rapidly drops in the utility grid and the electric power needs to be discharged from the electrical storage device 54 in order to recover from the drop in frequency.

Furthermore, in the above-described embodiment, a description has been given of a case where the wind power ant 50 includes the plurality of wind turbine generators 10; however, this embodiment is not limited thereto, and the wind power plant 50 may include only one wind turbine generator 10.

Furthermore, in the above-described embodiment, a description has been given of a case where one electrical storage device 54 is provided for the plurality of wind turbine generators 10; however, this embodiment is not limited thereto, and, as shown in FIG. 6, the electrical storage device 54 may be provided for each of the wind turbine generators 10.

In this case, the master controller 56 and the electrical-storage-device controller 58 are provided for each combination of the wind turbine generator 10 and the electrical storage device 54, and a SCADA (supervisory control and data acquisition) 90 receives the grid-demanded output power Pgrid_lim and sends the grid-demanded output power Pgrid_lim to each master controller 56.

| {Reference Signs List} | |
|---|---|
| 10 | wind turbine generator |
| 20 | blades |
| 50 | wind power plant |
| 52 | wind-turbine controller |
| 54 | electrical storage device |
| 56 | master controller |
| 58 | electrical-storage-device controller |

The invention claimed is:

1. A wind power plant that includes a wind turbine generator that supplies electric power to a utility grid, the wind turbine generator being connected to a plurality of blades, and an electrical storage device that is charged by electric power produced by the wind turbine generator or electric power supplied from the utility grid and that supplies electric power to the utility grid through discharging, the wind power plant comprising:
a wind-turbine control section that performs for the wind turbine generator,
a normal operation having a normal rotational speed of the blades, and generating a normal electric power,
an acoustic-noise suppression operation in which a rotational speed of the blades is controlled to a speed less than the normal rotational speed in the normal operation in order to suppress acoustic noise generated through rotation of the blades, and
an over power operation in which the rotational speed of the blades is controlled to a speed greater than the normal rotational speed in the normal operation to generate electric power greater than the normal electric power generated in the normal operation; and
an electrical-storage-device control section that causes the electrical storage device to be charged or discharged, based on a difference between an output power obtained when the acoustic-noise suppression operation is performed and a demanded output power demanded from the utility grid,
wherein when the acoustic-noise suppression operation is not performed, the wind-turbine control section makes the wind turbine generator perform the over power operation by increasing the rotational speed of the blades higher than the rotational speed of the blades in the normal operation, and
when the wind turbine generator is made to perform the over power operation, the electrical-storage-device control section causes the electrical storage device to be charged by electric power corresponding to a difference between the output power produced in the normal operation and the output power produced in the over power operation.

2. A wind power plant according to claim 1, wherein the electrical-storage-device control section causes the electrical storage device to discharge electric power when the output power is equal to or less than the demanded output power.

3. A wind power plant according to claim 1, wherein the electrical-storage-device control section causes the electrical storage device to be charged by electric power corresponding to a difference between the output power and the demanded output power when the output power exceeds the demanded output power.

4. A wind power plant according to claim 1, wherein
a plurality of wind turbine generators is installed adjacent to an area where a desired level of acoustic noise is regulated such that a level of the acoustic noise generated through the rotation of the blades is reduced to a predetermined value or lower; and
the wind-turbine control section cancels the acoustic-noise suppression operation of a wind turbine generator of the plurality of wind turbine generators that has a relatively-small acoustic-noise effect on the area when the electrical storage device is discharged for a predetermined period of time or more because of the acoustic-noise suppression operation.

5. A wind-power-plant control method for a wind power plant that includes a wind turbine generator that supplies electric power to a utility grid, the wind turbine generator being connected to a plurality of blades, and an electrical storage device that is charged by electric power produced by the wind turbine generator or electric power supplied from the utility grid and that supplies electric power to the utility grid through discharging, the wind-power-plant control method comprising:
performing for the wind turbine generator
a normal operation having a normal rotational speed of the blades, and generating a normal electric power,
an acoustic-noise suppression operation in which rotational speed of the blades is controlled to a speed less than the normal rotational speed in the normal operation in order to suppress acoustic noise generated through rotation of the blades, and
an over power-operation in which the rotational speed of the blades is controlled to a speed greater than the normal rotational speed in the normal operation to generate electric power greater than the normal electric power generated in the normal operation; and
causing the electrical storage device to be charged or discharged, based on a difference between an output power obtained when the acoustic-noise suppression operation is performed and a demanded output power demanded from the utility grid,
wherein when the acoustic-noise suppression operation is not performed, a wind-turbine control section makes the wind turbine generator perform the over power operation by increasing the rotational speed of the blades higher than the rotational speed of the blades in the normal operation, and
when the wind turbine generator is made to perform the over power operation, an electrical-storage-device control section causes the electrical storage device to be charged by electric power corresponding to a difference between the output power produced in the normal operation and the output power produced in the over power operation.

6. A wind-power-plant control method according to claim 5, wherein the rotational speed of the blades is controlled by varying a pitch angle of the blades.

7. A wind power plant according to claim 1, wherein the wind-turbine control section is configured to vary the pitch angle of the blades.

* * * * *